US 11,371,408 B2

United States Patent
Hirth et al.

(10) Patent No.: US 11,371,408 B2
(45) Date of Patent: Jun. 28, 2022

(54) ELECTRICALLY HEATABLE HEATING DISK

(71) Applicant: Vitesco Technologies GMBH, Hannover (DE)

(72) Inventors: Peter Hirth, Rösrath (DE); Ferdi Kurth, Mechernich (DE); Thomas Härig, Neunkirchen-Seelscheid (DE)

(73) Assignee: Vitesco Technologies GmBH, Hannover (DE)

( * ) Notice: Subject to any disclaimer, the term of this patent is extended or adjusted under 35 U.S.C. 154(b) by 0 days.

(21) Appl. No.: 17/226,133

(22) Filed: Apr. 9, 2021

(65) Prior Publication Data

US 2021/0222600 A1   Jul. 22, 2021

Related U.S. Application Data

(63) Continuation of application No. PCT/EP2019/077219, filed on Oct. 8, 2019.

(30) Foreign Application Priority Data

Oct. 9, 2018  (DE) .......................... 102018217244.7

(51) Int. Cl.
  *F01N 3/20* (2006.01)
  *F01N 13/00* (2010.01)
  *F01N 3/28* (2006.01)

(52) U.S. Cl.
  CPC .......... *F01N 3/2013* (2013.01); *F01N 3/2026* (2013.01); *F01N 3/281* (2013.01);
  (Continued)

(58) Field of Classification Search
  CPC ...... F01N 3/2013; F01N 3/2026; F01N 3/281; F01N 13/0093; F01N 2240/16;
  (Continued)

(56) References Cited

U.S. PATENT DOCUMENTS

| 5,433,926 A | 7/1995 | Swars |
| 5,480,621 A | 1/1996 | Breuer et al. |

(Continued)

FOREIGN PATENT DOCUMENTS

| CN | 107690514 A | 2/2018 |
| DE | 4307431 A1 | 9/1994 |

(Continued)

OTHER PUBLICATIONS

International Search Report and Written Opinion dated Oct. 8, 2019 from corresponding International Patent Application No. PCT/EP2019/077219.

(Continued)

*Primary Examiner* — Brandon D Lee

(57) ABSTRACT

An electrically heatable heating disk for use within a device for the aftertreatment of exhaust gas, wherein the heating disk is formed by a layer stack formed from a multiplicity of metal foils which are stacked one on top of the other, the layer stack being wound to form a honeycomb body, wherein the layer stack has alternately arranged, coarsely structured metal foils and finely structured or smooth metal foils, and wherein the honeycomb body has at least one electrical contact at a radial edge region, wherein first metal foils terminate with an offset with respect to one another as a result of the winding in the circumferential direction of the heating disk, wherein finely structured or smooth second metal foils which extend in the circumferential direction extend beyond the respective ends of the terminating first metal foils in the circumferential direction.

6 Claims, 1 Drawing Sheet

(52) U.S. Cl.
CPC ...... *F01N 13/0093* (2014.06); *F01N 2240/16* (2013.01); *F01N 2330/30* (2013.01)

(58) Field of Classification Search
CPC ........ F01N 2330/30; F01N 3/28; F01N 3/027; F01N 13/009; F01N 2330/44; Y02T 10/12; H05B 3/10
See application file for complete search history.

(56) References Cited

U.S. PATENT DOCUMENTS

| | | | |
|---|---|---|---|
| 6,513,324 | B2 | 2/2003 | Bruck et al. |
| 9,225,107 | B2 | 12/2015 | Hirth et al. |
| 9,393,521 | B2 | 7/2016 | Brueck et al. |
| 9,623,373 | B2 | 4/2017 | Brueck et al. |
| 10,364,721 | B2 | 7/2019 | Hirth et al. |
| 2014/0322090 | A1* | 10/2014 | Brueck ................. F01N 3/2026 422/174 |
| 2015/0011115 | A1 | 1/2015 | Hirth et al. |
| 2015/0030509 | A1* | 1/2015 | Brueck .............. B01D 53/8678 422/174 |

FOREIGN PATENT DOCUMENTS

| | | |
|---|---|---|
| DE | 19943846 A1 | 3/2001 |
| DE | 102012000496 A1 | 7/2013 |
| DE | 102012007020 A1 | 10/2013 |
| EP | 0412103 A1 | 2/1991 |
| WO | 2013104754 A1 | 7/2013 |

OTHER PUBLICATIONS

Chinese Office Action dated Feb. 21, 2022 for corresponding Chinese application No. 201980067112.X.

* cited by examiner

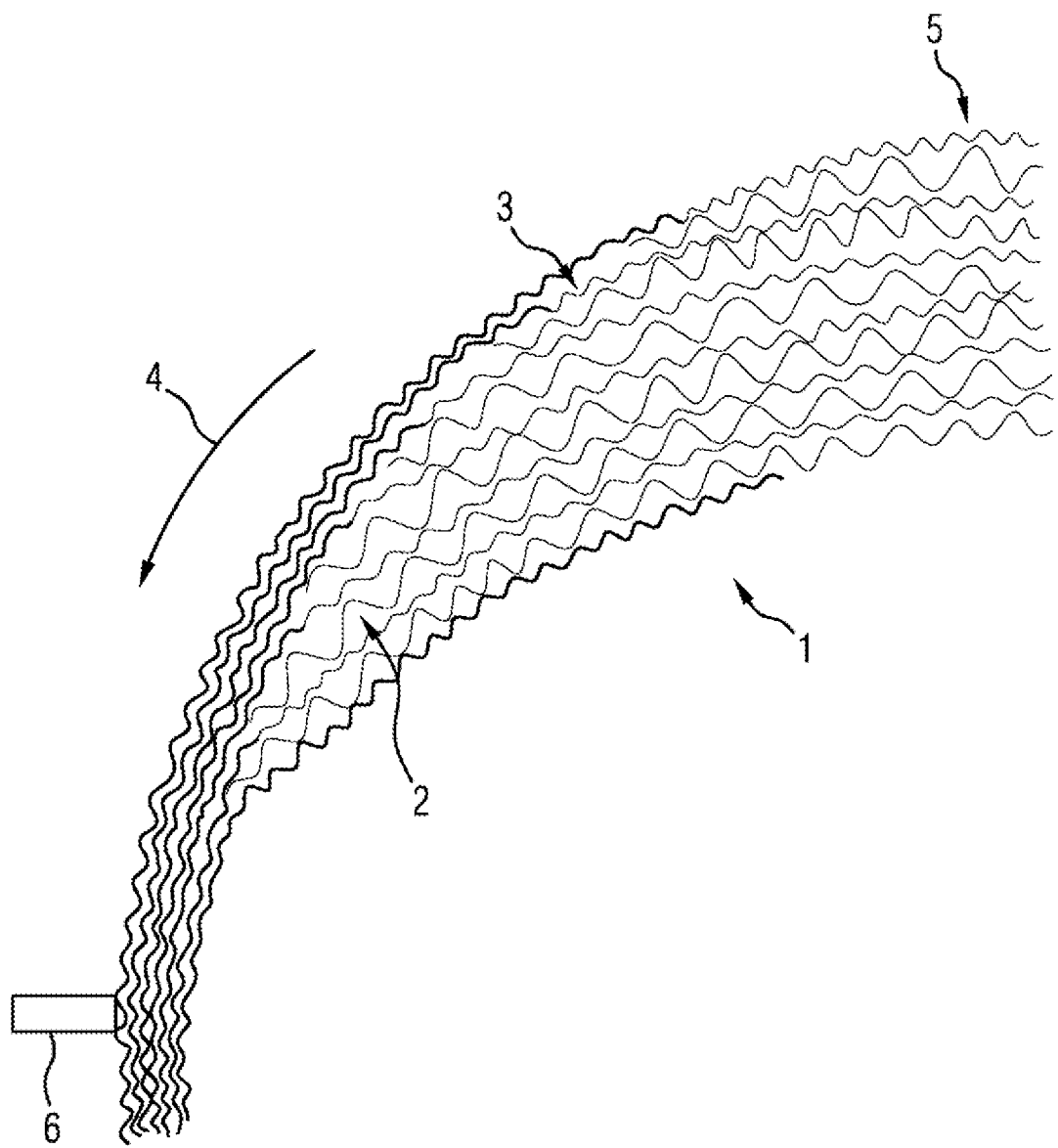

ELECTRICALLY HEATABLE HEATING DISK

CROSS-REFERENCE TO RELATED APPLICATIONS

This application claims priority to PCT Application PCT/EP2019/077219, filed Oct. 8, 2019, which claims priority to German Patent Application No. DE 10 2018 217 244.7, filed Oct. 9, 2018. The disclosures of the above applications are incorporated herein by reference.

FIELD OF THE INVENTION

The invention relates to an electrically heatable heating disk for use within a device for the aftertreatment of exhaust gas, wherein the heating disk is formed by a layer stack formed from a multiplicity of metal foils which are stacked one on top of the other, the layer stack being wound to form a honeycomb body, wherein the layer stack has alternately arranged, coarsely structured metal foils and finely structured or smooth metal foils, and wherein the honeycomb body has at least one electrical contact at a radial edge region, wherein first metal foils terminate with an offset with respect to one another as a result of the winding in the circumferential direction of the heating disk.

BACKGROUND OF THE INVENTION

In the prior art, electrically heated heating disks are known for use in exhaust systems. As a result of the heating of the heating disks, the stream of exhaust gas is heated independently of the operation of the internal combustion engine, as result of which the temperature which is necessary for optimum aftertreatment of the exhaust gas can be reached earlier. The heating disks are preferably produced from a metallic basic material, and differently structured metal foils are produced, for example, by winding on a layer stack.

A current usually flows through the heating disks here, wherein the heating disk is heated by using the ohmic resistance.

Electric contact with the heating disk is usually made here by means of an electrical feed line which is guided through the casing surrounding the catalytic converter and/or the heating disk.

U.S. Pat. No. 5,433,926 A presents for example an electrically heatable heating disk in a device for the aftertreatment of exhaust gas. U.S. 2015011115 A1 presents an electrical feedthrough for making electrical contact with the heating disk in the interior of the casing which surrounds the catalytic converter.

A disadvantage with the devices in the prior art is, in particular, that the uniform distribution of the current which is introduced into the heating disk is not ensured to a sufficient degree in order also to satisfy the increased requirements which are made of the heating capacity at the present and in the future. This is disadvantageous since in order to achieve higher heating capacities the introduced currents must necessarily be increased. If insufficient uniform distribution of the current is present, local hotspots are produced, which are disadvantageous in respect of the durability of the heating disk.

Furthermore, the currently known geometric configuration of the heating disk in the region of the electrical contact can cause flow bypasses past the heating disk to be formed, which is disadvantageous in terms of the efficiency of the heating device which is formed by the heating disk.

SUMMARY OF THE INVENTION

It is therefore the object of the present invention to provide an electrically heatable heating disk which has an optimum configuration in the region of the electrical contact, in order, on the one hand, to provide the best possible uniform distribution of the current and, on the other hand, as completely as possible prevents flow bypasses from coming about.

The object relating to the electrically heatable heating disk is achieved by a heating disk having the features described herein.

An exemplary embodiment of the invention relates to an electrically heatable heating disk for use within a device for the aftertreatment of exhaust gas, wherein the heating disk is formed by a layer stack formed from a multiplicity of metal foils which are stacked one on top of the other, the layer stack being wound to form a honeycomb body, wherein the layer stack has alternately arranged, coarsely structured metal foils and finely structured or smooth metal foils, and wherein the honeycomb body has at least one electrical contact at a radial edge region, wherein first metal foils terminate with an offset with respect to one another as a result of the winding in the circumferential direction of the heating disk, wherein finely structured or smooth second metal foils which extend in the circumferential direction beyond the respective ends of the terminating first metal foils are arranged between the first metal foils which terminate with an offset in the circumferential direction.

The term coarsely structured metal foils refers, in an embodiment, to metal foils in which a corrugation has been formed. The corrugation may extend here over the entire metal foil or else only over parts of the metal foil. In comparison with this, a smooth metal foil does not have any structuring at all. A finely structured metal foil may also have a structure formed in it, but the structure, for example the corrugation, is significantly smaller than in the case of the coarsely structured metal foil. In an embodiment, the height and the width of the structure are significantly smaller in a finely structured metal foil than in a coarsely structured metal foil. The finely structured metal foil or the smooth metal foil is mainly used to separate the directly adjacent coarsely structured metal foils from one another, so that the coarsely structured metal foils do not catch on one another during the winding on process.

The winding on of the layer stack to form a disk causes a relative movement between the metal foils in the circumferential direction, as a result of which adjacent metal foils slide along one another. The end regions of the metal foils which are located in a radial direction of the heating disk are shifted with respect to another by the winding on process, as a result of which they terminate with an offset with respect to one another in the circumferential direction. In practice this therefore results in a sickle-shaped region, which becomes thinner in the circumferential direction as a result of the successive termination of the individual layers, until finally the last terminating layer forms the termination. This may be compared, for example, with the resulting offset of the individual pages in a rolled-up newspaper.

The smoothly or finely structured metal foils are longer than the coarsely structured metal foils, so that they project beyond the coarsely structured metal foils which terminate with an offset with respect to one another. The smooth or finely structured layers are preferably dimensioned in such a way that when the heating disk is completely rolled up they end at the same point when viewed in the circumferential direction. The smooth or finely structured metal foils preferably each have for this purpose different lengths which compensate the offset which results from the winding on process.

As a result of the successive termination of the coarsely structured metal foils in the radial edge region of the heating disk, incremental thinning of the wound-on layer stack is brought about, as a result of which, the ends of the metal foils are prevented from resting in a bulging fashion on the external circumference of the heating disk.

Such a bulging formation on the radial outer region of the heating disk would produce a cross-section which deviates from the ideal circular shape. This is avoided by the successive termination in the circumferential direction, as a result of which, the undesired bypass flows past the heating disk may also be reduced or entirely avoided.

In an embodiment, the first metal foils which terminate with an offset are coarsely structured. The coarsely structured metal foils contribute to a significantly greater degree to the thickness of the layer stack than the finely structured or smooth metal foils, since corrugation of the coarsely structured metal foils forms the duct structures of the heating disk, through which there is a flow in the axial direction.

In order to produce a heating disk with a diameter which is as far as possible an ideal circular one, it is, however, necessary to reduce the thickness of the layer stack at the end regions, wherein at the same time the absolute thickness of the material is to be kept as high as possible in these end regions so that optimum introduction of current may be ensured. As a result of the successive termination of the coarsely structured metal foils, the cell density is incrementally reduced in this end region, wherein the absolute thickness of the material of the metal foils of the layer stack remains the same or is even increased through suitable measures.

In an embodiment, the second metal foils have, in the part which protrudes in the circumferential direction beyond the respectively directly adjacent first metal foils, a thickness in material which is increased in comparison with the rest of the extent of the respective second metal foil.

The increase in the thickness of the material of the second metal foils keeps the overall thickness of material which is present in this region, which serves for forming the electrical contact in order to introduce current, precisely the same as in the sections with the first metal foils, or even to increase it beyond this. A sufficiently large thickness of the material is necessary to bring about uniform introduction of the current over the cross-section of the wound layer stack. In an embodiment, this prevents undesired hotspots which could be produced as a result of the introduced current with an introduction region with an excessively small thickness of the material.

A preferred exemplary embodiment is characterized in that the second metal foils extend in the circumferential direction as far as a common end region.

The extent as far as a common end region ensures a uniform thickness of the material of the wound-on layer stack in the region of the electrical contact. The region at which the electrical contact is made must have a certain minimum material thickness in order to avoid excessive heating occurring owing to the introduction of current. There is a relationship between the magnitude of the introduced current and the volume of the material into which the current is introduced, and the heating which results therefrom (Joule's Law). Expressed in simplified terms, a larger magnitude of current with constant material volume could rise to increased heating. In order then to limit the maximum temperature which occurs at a predefined magnitude of current, the material volume must be correspondingly adapted in the region of the introduction of current.

The offset termination of the first metal foils in the circumferential direction successively reduces the volume of material available for the introduction of the current, but on the other hand the continuation of the second metal foils and the simultaneous increase in the thickness of the material after the termination of the respective first metal foils brings about an increase in the volume of material, so that the volume of material which is ultimately available corresponds at least to the volume of material which the layer stack has before the termination of the first metal foil.

It is also to be preferred if the electrical contact is arranged at the part of the second metal foils which protrudes beyond the first metal foils in the circumferential direction. As has already been described above, in this part there is a sufficient thickness of material or a sufficient volume of material to permit the introduction of current without the risk of a defined maximum temperature being exceeded in this context.

Moreover, in an embodiment, the thickness of the material of the second metal foils in the protruding part is greater by at least a factor of 1.5 to four in comparison with the rest of the extent of the respective second metal foils.

The increase by a factor of 1.5 to four ensures, despite the termination of the first metal foils, a sufficient thickness of material or a sufficient volume of material, without an accompanying risk of damage owing to excessively high temperatures. Since an adjacent second metal foil is made to continue to each first terminating metal foil, the increasing of the thickness of the material of the second metal foil by a factor of 1.5 to four ensures that the volume of material which is available in the region of the introduction point is at least as large as in the regions of the layer stack in which none of the metal foils have been terminated yet.

It is also expedient if the second metal foils which extend over the terminating first metal foils are arranged in the radial edge region of the honeycomb body. This ensures that, in a region arranged radially on the outside, a region may be formed for the electrical contact by the relatively long second metal foils.

In an embodiment, the layer stack is wound on, but the layer stack does not come to bear on itself but instead a gap is produced between the individual turns of the wound-on layer stack, so there is no electrical contact between the turns. As a result of the lengthened second metal foils, the region in which the electrical contact may occur is formed here on the radially outwardly directed regions of the heating disk.

Moreover, in an embodiment, the layered stack alternately has a first metal foil and a second metal foil, wherein the second metal foils have a longer extent in the circumferential direction than the first metal foils. This prevents the first metal foils from becoming caught on one another as the layer stack is wound on.

Furthermore, it is expedient if the honeycomb body has two electrical contacts, wherein the electrical contact between the power feed or the power discharge and the layer stack occurs in each case in a region which is formed from second metal foils which protrude out in the circumferential direction over the first metal foils.

With such an arrangement of the feed line and of the discharge line, electrical contact is made very easily with a wound-on honeycomb body whose turns are electrically insulated from one another, for example as a result of spacing apart or as a result of the introduction of an electrical insulator.

Other embodiments of the present invention are described in the following description of the FIGURES.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be explained in detail below on the basis of an exemplary embodiment and with reference to the drawing. In the drawing:

FIG. 1 shows a sectional view through an inventive honeycomb body of an electrically heatable heating disk.

DETAILED DESCRIPTION OF THE PREFERRED EMBODIMENTS

The following description of the preferred embodiment(s) is merely exemplary in nature and is in no way intended to limit the invention, its application, or uses.

FIG. 1 shows a sectional view through part of a heating disk 1 which is produced from a wound-on layer stack. The heating disk 1 is formed from a layer stack which is composed of a multiplicity of wound-on metal foils 2, 3. In the exemplary embodiment shown, first metal foils 2 with a coarse structure or coarse corrugations are shown, and second metal foils 3 with a fine structure or micro-corrugations are shown.

The first and second metal foils 2, 3 are stacked alternately one on top of the other and therefore form the layer stack. The heating disk 1 is generated by the winding on of the layer stack.

FIG. 1 shows the radially outer end region of the layer stack which is wound on to form the heating disk 1. The first metal foils 2 are all of the same length. As a result of the winding on, the first metal foils 2 move relative to one another in the circumferential direction and as a result of the different radii which the first metal foils 2 assume in the wound-on state, a sickle-like shape is produced for the first metal foils 2 which terminate with an offset with respect to one another in the circumferential direction 4.

The second metal foils 3 are made longer than the first metal foils 2 and therefore extend further in the circumferential direction 4 than the terminating first metal foils 2. The successive termination of the first metal foils 2 increasingly reduces the thickness of the layer stack in the circumferential direction 4. After the termination of the last first metal foil 2, the layer stack is finally formed just from the relatively long second metal foils 3. In this region which is only then formed from the second metal foils 3, the layer stack has a significantly smaller thickness, since the first metal foils 2 no longer project into this region. This is seen clearly since the cells formed by the coarse structure of the first metal foils 2 are no longer present in this region.

The second metal foils 3 are embodied in such a way that they have a thickening directly before the termination of the respectively directly adjacent first metal foil 2, wherein the second metal foils 3 have this increased thickness of material up to their own end region. In addition, the top metal foil and the bottom metal foil of the layer stack, which are both formed by finely structured second metal foils 3, also each have an increased thickness of material. The thickening of these two metal foils 5 already takes place before the first termination of the first metal foil 2, when viewed in the circumferential direction 4. This thickening also serves, inter alia, to increase the stability of the heating disk 1.

The reference number 6 indicates an electrical contact which serves to introduce the current or to discharge the current into the layer stack or discharge it therefrom. The electrical contact 6 is arranged in a region which is formed completely from second metal foils 3.

FIG. 1 does not have a limiting character and serves to clarify the inventive concept.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrically heatable heating disk for use within a device for the aftertreatment of exhaust gas, the heating disk comprising:
    a layer stack formed from a plurality of coarsely structured metal foils and a plurality of finely structured or smooth metal foils, which are alternately arranged, and are stacked one on top of the other, and the layer stack being wound to form a honeycomb body; and
    at least one electrical contact arranged at a radial end region of the honeycomb body;
    wherein the plurality of coarsely structured metal foils terminate with an offset with respect to one another as a result of the winding in the circumferential direction of the heating disk, and the plurality of finely structured or smooth second metal foils extend in the circumferential direction beyond the respective ends of the plurality of coarsely structured metal foils;
    wherein a portion of each of the plurality of finely structured or smooth metal foils, which protrudes in the circumferential direction beyond the respectively directly adjacent plurality of coarsely structured metal foils, include a material thickness which is increased in comparison with the rest of the extent of the respective finely structured or smooth metal foil, and
    wherein the portion of each of the plurality of finely structured or smooth metal foils which includes the material thickness which is increased begins directly before the termination of the respective directly adjacent plurality of coarsely structured metal foils.

2. The electrically heatable heating disk of claim 1, wherein the thickness of the portion of each of the plurality of finely structured or smooth metal foils, which protrudes in the circumferential direction beyond the respectively directly adjacent plurality of coarsely structured metal foils, is higher by a factor of 1.5 to four in comparison with the rest of the extent of the respective finely structured or smooth metal foils.

3. The electrically heatable heating disk of claim 1, wherein the plurality of finely structured or smooth metal foils extend in the circumferential direction as far as an end region.

4. The electrically heatable heating disk of claim 1, wherein the electrical contact is arranged at the part of each of the plurality of finely structured or smooth metal foils which protrude in the circumferential direction beyond the plurality of coarsely structured metal foils.

5. The electrically heatable heating disk of claim 1, wherein the plurality of finely structured or smooth metal foils which extend over the terminating plurality of coarsely structured metal foils, are arranged in a radial edge region of the honeycomb body.

6. The electrically heatable heating disk of claim 1, the honeycomb body further comprising two electrical contacts, wherein at least one of the two electrical contact between a power supply or a power discharge and the layer stack occurs in each case in a region which is formed from plurality of finely structured or smooth metal foils which protrude in the circumferential direction beyond the plurality of coarsely structured metal foils.

* * * * *